Figure 1:
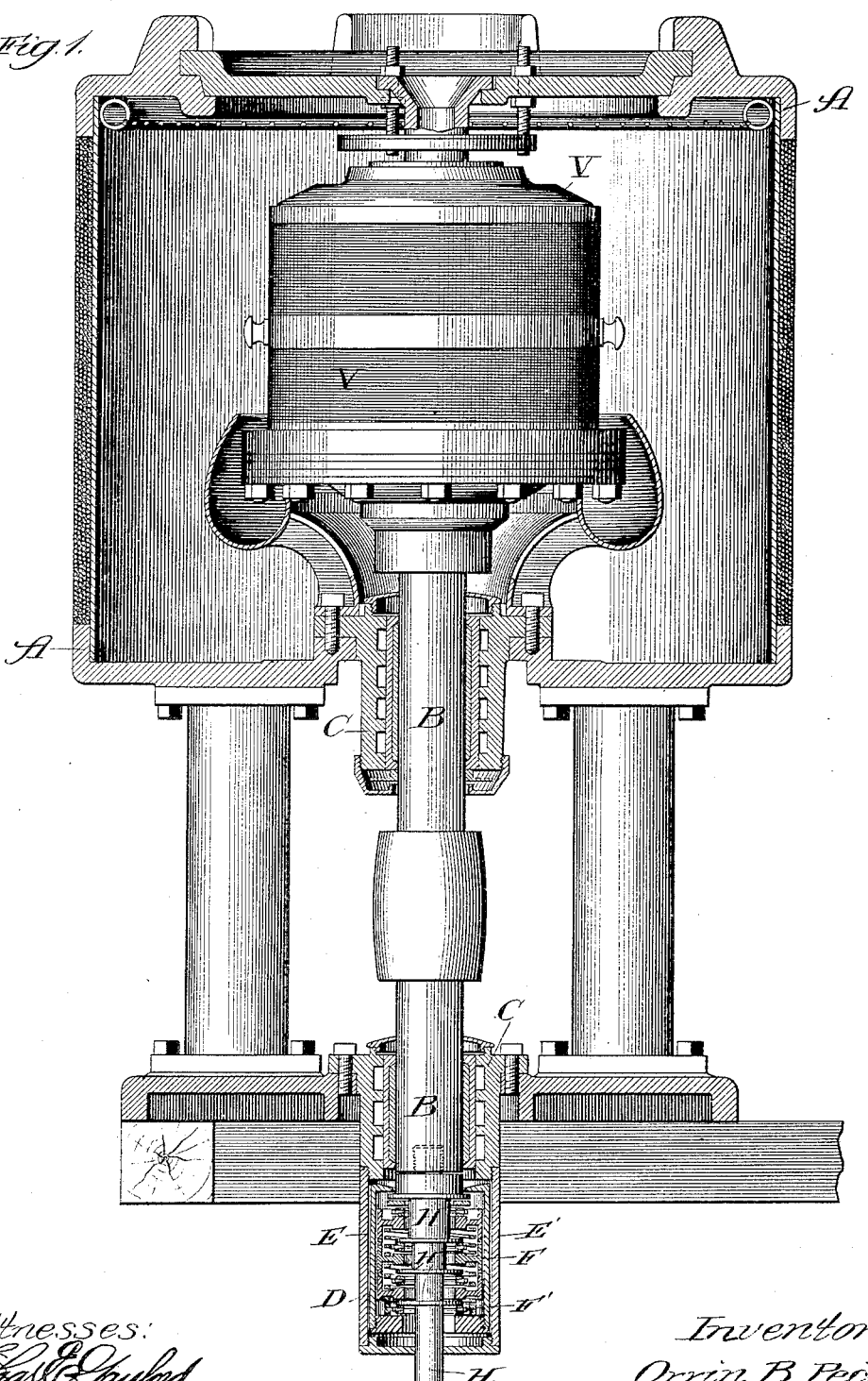

(No Model.) 4 Sheets—Sheet 1.

O. B. PECK.
END THRUST BEARING.

No. 433,143. Patented July 29, 1890.

(No Model.) 4 Sheets—Sheet 2.
O. B. PECK.
END THRUST BEARING.
No. 433,143. Patented July 29, 1890.
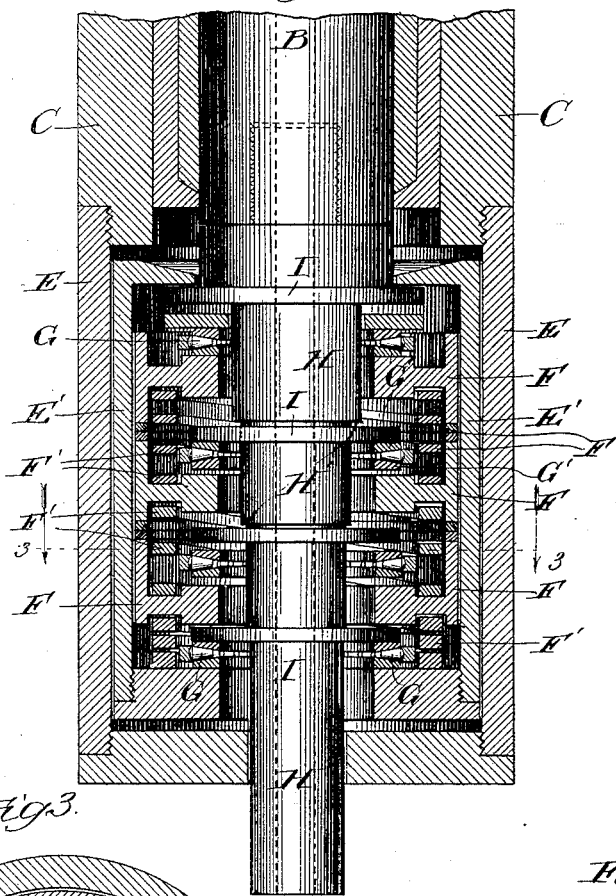
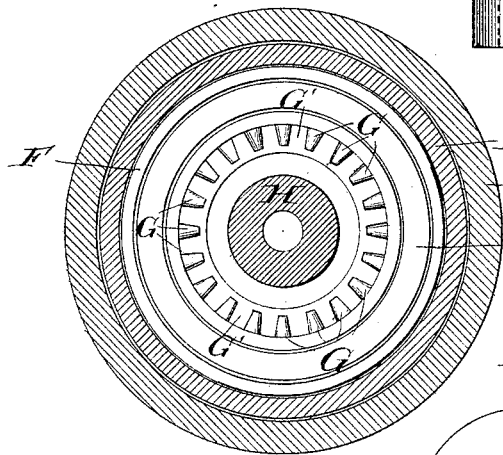
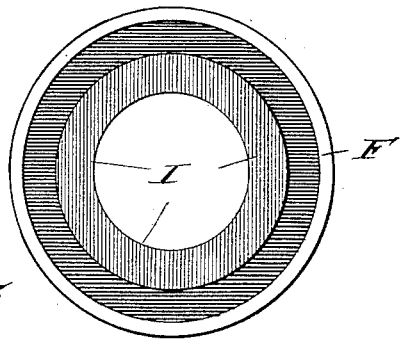
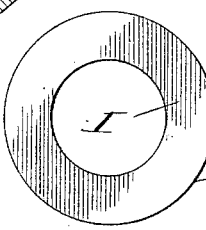
Witnesses:
Chas. E. Gaylord,
Clifford N. White
Inventor:
Orrin B. Peck,
By Banning & Banning & Payson,
Attys.

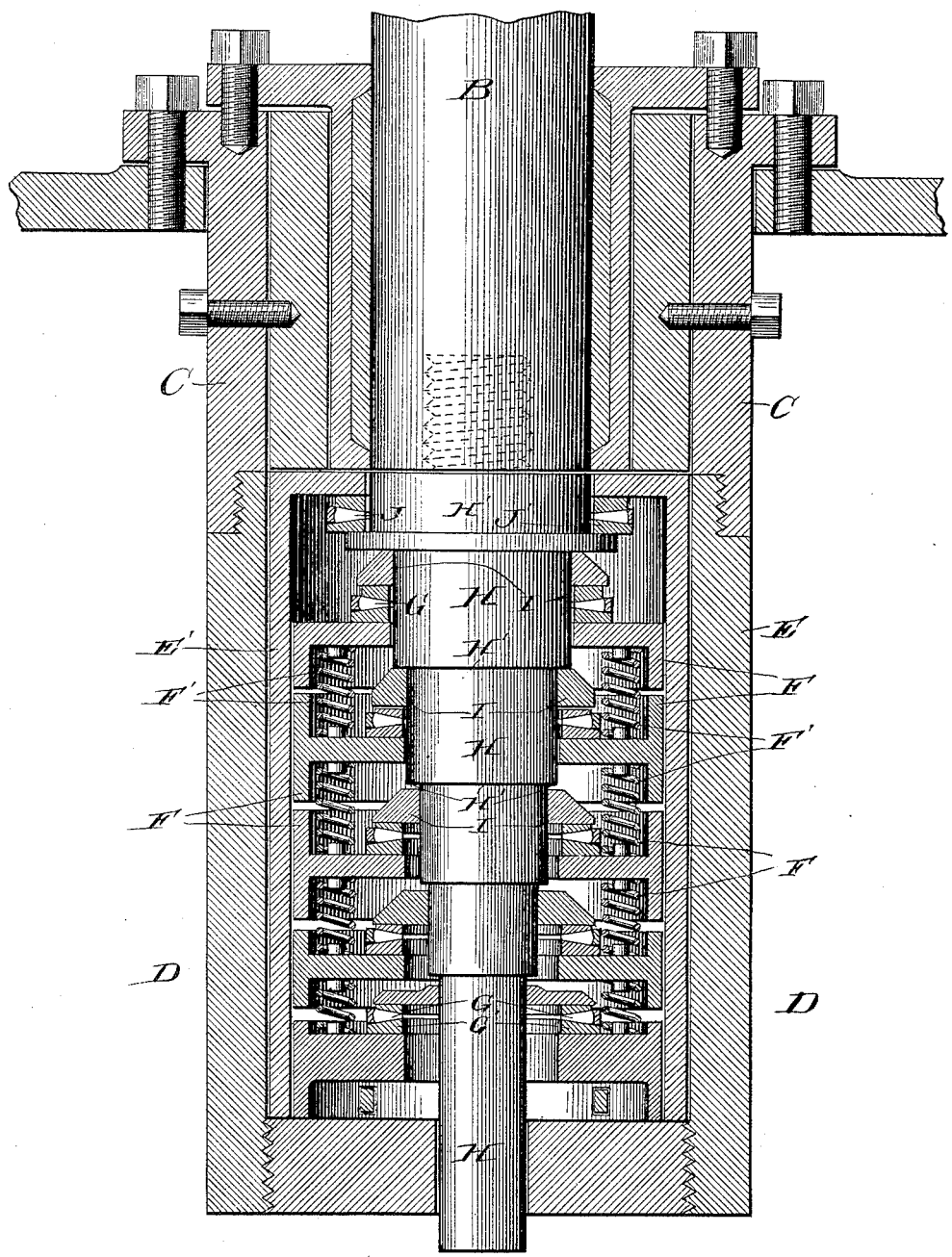

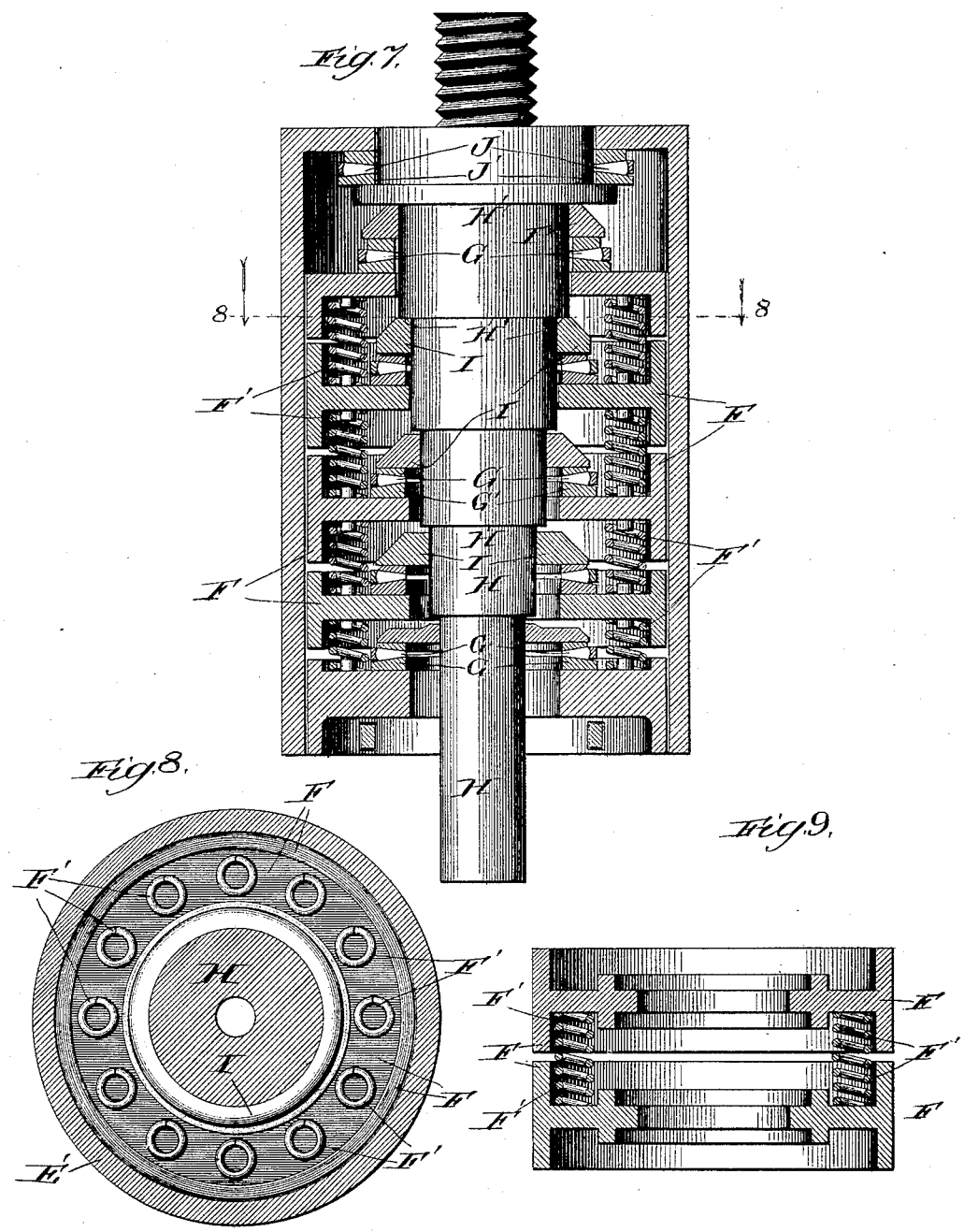

UNITED STATES PATENT OFFICE.

ORRIN B. PECK, OF CHICAGO, ILLINOIS, ASSIGNOR TO MELINDA PECK, OF SAME PLACE.

END-THRUST BEARING.

SPECIFICATION forming part of Letters Patent No. 433,143, dated July 29, 1890.

Application filed March 3, 1890. Serial No. 342,434. (No model.)

*To all whom it may concern:*

Be it known that I, ORRIN B. PECK, a citizen of the United States, residing at Chicago, Illinois, have invented a new and useful Improvement in End-Thrust Bearings for Machines for Centrifugally Treating Molten Material, of which the following is a specification.

The object of this invention is to provide a suitable end or thrust bearing to support the weight of the shaft and the load imposed thereon; and the invention consists in the features and details of construction hereinafter described and claimed.

In the drawings, Figure 1 is a vertical elevation, partly in section, of a centrifugal machine provided with my improved bearing; Fig. 2, a vertical central section of the bearing; Fig. 3, a cross-section of the bearing taken on line 3 3 of Fig. 2, looking in the direction of the arrows; Figs. 4 and 5, detailed views of parts of the bearing; Fig. 6, a vertical section showing the bearing somewhat modified; Fig. 7, a similar section of the bearing removed from the journal box; Fig. 8, a cross-section taken on line 8 8 of Fig. 7, looking in the direction of the arrows; and Fig. 9, an enlarged view of the portion of the bearing shown in Figs. 6 and 7.

V is the receiving-vessel; A, the curb surrounding the same; B, the shaft for supporting and revolving the receiving-vessel; C C, journal-boxes for maintaining the vertical position of the shaft, and D the end or thrust bearing for supporting the shaft with its superimposed weight.

Inasmuch as the construction of the receiving-vessel and the curb and other parts of the apparatus not hereinafter particularly set forth has already been described in prior patents and applications, and will be obvious from an inspection of the drawings, they require no further description.

The shaft B is frequently required to support a very great load, and to revolve therewith at a high rate of speed, so that it has been found difficult and impracticable to support the thrust or pressure of the end of the shaft upon one set of rollers or upon any other ordinary bearing; and the object of my invention is to provide means for distributing the weight of the shaft and its load over a number of sets of rollers in such manner that each set shall only bear its appropriate part of the load. I accomplish this preferably in the manner hereinafter described.

The journal-boxes C C are preferably of the ordinary well-known type, and to the bottom of the lower journal-box I prefer to attach an end or thrust bearing D. This bearing, in the preferable construction, comprises an outer shell or case E, which is attached to the journal-box C, and which serves to hold the inner frame or cylinder E', in which the other parts of the bearing are contained. The cylinder E' is internally bored to form a vertical cylinder, and within this cylinder are placed a number of disks or plungers F, which fit the inside of the cylinder accurately, and are free to move up and down therein. These disks or plungers serve as supports and guides for the anti-friction rollers and their bearings, and also serve to maintain the rollers in a position at right angles to the axis of the shaft. Between these plungers I place one or more springs F', holding the plungers normally apart, the top to be compressed with the weight of the shaft, as hereinafter described. The anti-friction rollers G are preferably placed between suitable annular bearings G', which are supported upon the upper surface of the plungers F, the relative arrangement of these parts being more particularly shown in Fig. 6.

I next construct a stud or shaft H, preferably of the form shown in the drawings, and which is preferably attached to the lower end of the shaft B. This shaft is provided with a number of suitable bearing-surfaces adapted to rest upon the sets of the anti-friction rollers or their bearings. In the drawings I have shown the shaft provided with a number of shoulders H', formed by turning down or reducing the diameter of the shaft at each of the shoulders, as shown, and I interpose between these shoulders and the bearing of the rollers the rings I, thus providing a means for supporting the shaft upon the various sets of rollers. It should be understood, however, that this method of constructing the bearing-surfaces may be modified or varied as desired—as, for instance, the shaft may be left of the same diameter throughout and provided with suitable rings or projections attached in any suitable manner to the shaft; or grooves or recesses may be formed in the surface of the shaft, in order to receive the rollers; or any other mode of construction may be used which will enable the shaft to rest upon the various sets of rollers.

When the parts of this bearing are put together for use, the first or uppermost shoulder or ring H' upon the shaft rests upon the ring I, which in turn rests upon the bearing of the first set of rollers. These rollers rest upon and are supported by the uppermost plunger F. This plunger is mounted upon a spring or springs F', interposed between it and the one next beneath it, and in like manner each one of the plungers is normally supported upon the plunger beneath it by means of the interposed springs, the lower plunger being securely fastened to the cylinder E. The second shoulder H' upon the shaft rests upon the second ring I, which in turn rests upon the bearing of the second set of rollers, which are supported upon the upper surface of the second plunger or disk, and in like manner each of the shoulders or bearing-surfaces with which the shaft is provided is supported either directly or indirectly through the interposed ring upon its appropriate set of rollers. It will be seen from this that each one of the disks or plungers supports a set of rollers, and that upon each of these sets of rollers one of the bearing-surfaces of the shaft is adapted to rest, either directly or with the interposed ring I, as desired. In the drawings I have shown two forms of springs adapted to be interposed between the plungers, but any other mode of obtaining the requisite resistance may be employed in place of these springs, if desired.

In Figs. 6 and 7 I have shown a supplemental set of rollers J, interposed between the ring J', resting against the upper shoulder of the shaft and the upper end of the frame or cylinder E', the object of these rollers being to maintain the parts in their proper relative positions when there is no weight upon the shaft; but these supplemental rollers are not essential and may be omitted, if desired.

For the sake of illustration we will suppose a weight of five thousand pounds to be imposed upon and borne by the shaft, and that we have five sets of rollers, and consequently five sets of bearing-surfaces provided upon the shaft; and under these conditions the operation is as follows: The plungers are normally held apart from each other by means of the interposed springs. The spring or springs interposed between the first and second plungers are designed to support the weight of a thousand pounds, the second set of springs a weight of two thousand pounds, and the third and fourth sets three and four thousand pounds, respectively. The entire weight of five thousand pounds is thus supported and transmitted by the shaft H. The first set of rollers being supported by the springs beneath the first plunger, will consequently sustain only a thousand pounds of the load which such springs are designed to carry. The second set of springs being designed to carry two thousand pounds, will support the thousand pounds of pressure applied to the first spring, and also enable the second set of rollers to sustain another thousand pounds of the load. In like manner the third set of springs, which are designed to sustain three thousand pounds, will sustain the pressure of the two thousand pounds of the first set of springs, and enable the third set of rollers, which are supported by this spring, to sustain another thousand pounds of the load. The fourth set of springs, designed to carry four thousand pounds, will act in the same manner and carry the pressure of the superimposed springs, and enable the fourth set of rollers to sustain a fourth thousand pounds. The fifth or last set of rollers, which are, as above stated, supported upon a fixed base, will receive the remainder of the load in the case supposed, amounting to a thousand pounds. The load is thus distributed over all the sets of anti-friction rollers, and by varying the relative strength of the springs the load may be distributed uniformly or otherwise, as desired.

The springs, rollers, and other parts of this device are held in place in a frame or cylinder E' by means of the fixed bottom thereof, and by this construction I am enabled to remove the bearing for repairs or any other purpose by simply withdrawing such frame or cylinder from the outer shell E without disarranging any of the parts. If it be desired to take out any of the rollers, springs, or other parts of the bearing, the bottom of the frame or cylinder may be removed and the parts slid out therefrom.

I claim—

The combination, with a revoluble driving-shaft, of a removable bearing provided with plungers, and rollers and springs between the plungers, substantially as described.

ORRIN B. PECK.

Witnesses:
GEORGE S. PAYSON,
SAMUEL E. HIBBEN.